March 2, 1954

C. BURNS ET AL  2,670,651
METHOD AND APPARATUS FOR CONTINUOUSLY MEASURING
A DIMENSION OF A MOVING OBJECT

Filed Aug. 14, 1950

INVENTORS:
Charles Burns
Samuel S. Carlisle,
By: Pierce, Scheffler & Parker
ATTORNEYS.

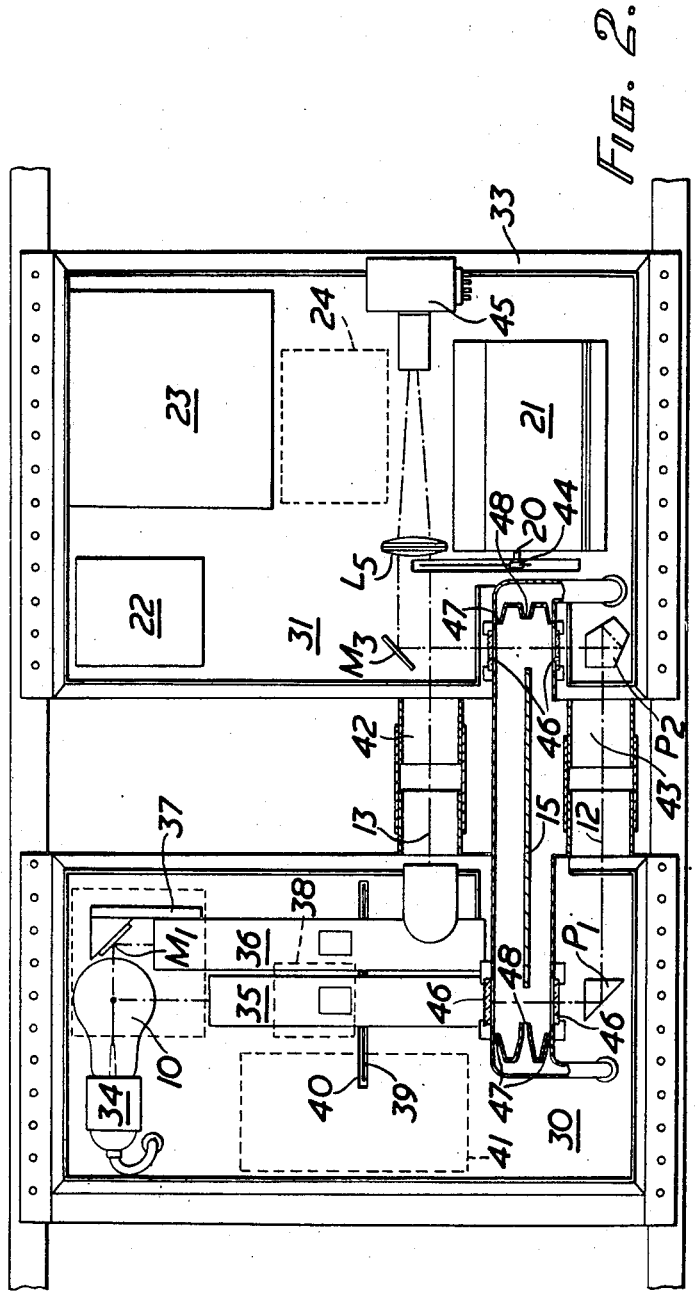

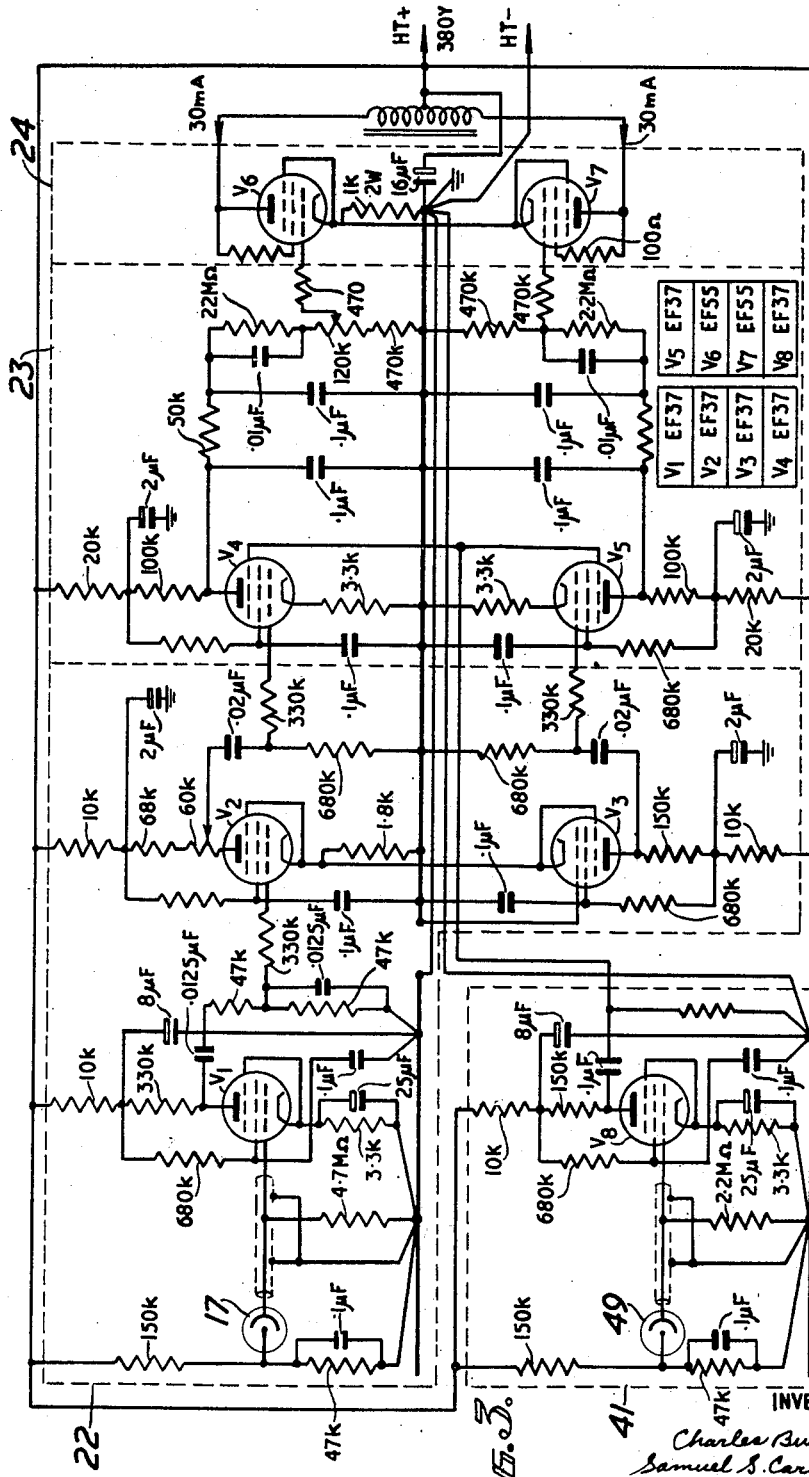

Patented Mar. 2, 1954

2,670,651

UNITED STATES PATENT OFFICE 2,670,651

METHOD AND APPARATUS FOR CONTINUOUSLY MEASURING A DIMENSION OF A MOVING OBJECT

Charles Burns and Samuel S. Carlisle, London, England, assignors to The British Iron & Steel Research Association, London, England, a British company Application August 14, 1950, Serial No. 179,304

Claims priority, application Great Britain August 18, 1949

2 Claims. (Cl. 88—14)

This invention relates to methods and apparatus for continuously measuring a dimension of a moving object and more particularly for continuously measuring the width of a moving strip or plate. One object of the invention is to obtain accurate measurements of a dimension of a moving object irrespective of any bodily movement of the object in the plane of or normal to the direction of the dimension.

For a better understanding of the invention one basic method of measuring a dimension of a moving object in accordance therewith will first be described briefly, before consideration is given to specific arrangements of apparatus for performing the methods of measurement. For convenience the method will be described with reference to the measurement of the width of a moving strip or plate, though the invention is not limited to such objects or dimensions.

In this basic method a light beam is formed by collimating the light from a source so as to form a parallel beam. This beam is directed past one edge of the object in a direction perpendicular to its width. The beam is then optically directed so that it eventually passes the opposite edge of the object again in a direction perpendicular to its width. The optical path of the beam is arranged so that an odd number of lateral inversions take place between the two edges of the object. The side of the beam furthest from the first edge of the object will then become the side nearest to the second edge of the object, as it passes by the latter. If the axis of the beam is placed near enough to each edge of the object, by suitable arrangement of the optical apparatus, then one edge of the object will intercept a portion of the beam on one side, and the second edge of the object intercept a portion of the beam on its other side. The width of the beam after it has been curtailed by both edges (hereafter called the residual beam) will be related inversely to the width of the object, if the beam has a uniform width of cross section along the direction of the edges of the object. As the width of beam intercepted by the object is the sum of the effects of the two edges, a movement of the object parallel to its width will not alter the width of the residual beam. Likewise movement perpendicular to the width will have no effect since the beam is parallel; these conditions being both subject to certain limitations on the angle of divergence of the beam caused by the finite size of the real or virtual light source. Thus any variation in the width of the object will appear as variation in the total amount of light carried by the beam which can readily be detected, for example by a photo-electric arrangement.

In practice it is generally desirable to also use a comparison beam which comes from the same source as is used to form the measuring beam already described. The comparison beam is automatically modulated so that it conveys to the photo-electric receiver, or other measuring means, as much light flux as is carried by the measuring beam. The degree of modulation is then proportional to the width of the body. Electrical and mechanical arrangements may be provided which permit of the use of a single photocell to measure the light flux carried by both beams individually, and also automatically controls the comparison beam to maintain equality between the beams. At the same time the means of controlling the comparison beam is made to indicate, e. g. by an electric current, or the mechanical movement of a shutter the width of the comparison beam, which being kept in a constant ratio to the width of the measuring beam, serves as a measure of strip width.

Two specific arrangements of apparatus in accordance with this invention and adapted for measuring the width of hot steel strip as it emerges from a rolling mill will now be described, by way of example only, with reference to the accompanying drawings in which—

Figure 2 is a general arrangement drawing showing the construction of this first arrangement.

Figure 3 is a circuit diagram of the electronic portion of the apparatus which is the same in both arrangements.

Figure 1:
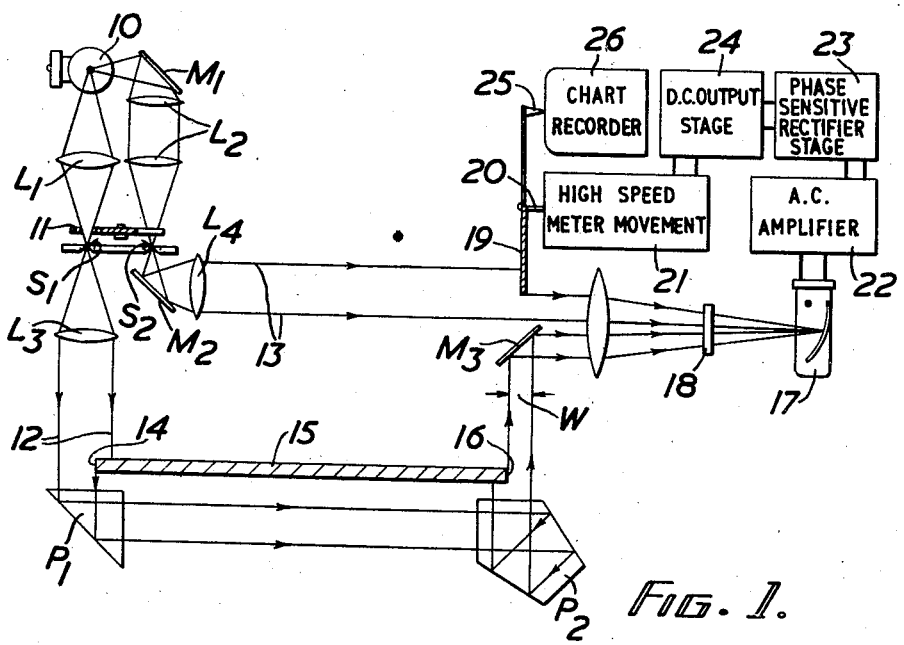
Figure 1 is a schematic diagram of the first arrangement, whilst

Referring first to Figure 1 light from a lamp $10$, is collimated by a lens $L_1$ to fall on a slit $S_1$ and by lenses $L_2$, after reflection by a mirror $M_1$, to fall on a slit $S_2$. In front of the slits $S_1$ and $S_2$ there is mounted a rotatable chopper disc $11$ having the form of a toothed wheel, the angular width of each tooth, and each gap between teeth, being equal to the angular distance between the slits, which are so orientated as to be parallel to the tooth edges. Accordingly, when the chopper disc $11$ is rotated by a motor (not shown), the two slits $S_1$ and $S_2$ are covered and uncovered alternately, the light falling on one when it is cut off from the other. The two beams from the virtual sources formed by the slits $S_1$ and $S_2$, the latter after being turned through a right angle by mirror $M_2$, are made parallel by lenses $L_3$ and $L_4$, to form the measuring beam 12 and the comparison beam 13 respectively. The measuring beam 12 is directed past one edge 14 of the strip 15 whose width is to be measured and is curtailed thereby. The partly curtailed measuring beam 12 is thereafter reflected through a right angle by the prism $P_1$ and after travelling in a direction parallel to the width of the strip 15 is again reflected through a right angle by a pentagonal prism $P_2$ and directed past the second edge 16 of the strip 15 laterally inverted with respect to the strip 15. That is, the other side of the beam 12 from that which was curtailed by the edge 14 is thus curtailed by the edge 16. This is due to the combination of the right angle prism $P_1$ and the pentagonal prism $P_2$ which provide an odd number of lateral inversions. It will be appreciated that variations in the width of the strip 15 will be accompanied by variations in the residual width W of the measuring beam.

The residual portion of the measuring beam 12 is then reflected through a right angle by mirror $M_3$ so that it is again parallel with the comparison beam 13. Both pass through lens $L_5$ which focusses them on the cathode of a photocell 17, the resulting image being an image of $S_1$ and $S_2$ superposed, since the photocell cathode is placed in the focal plane of lens $L_5$, and the beams enter the lens $L_5$ parallel to one another. A diffusing plate 18 is interposed in front of the photocell 17, to spread the illumination over a greater area of the cathode. The arrangement of lens $L_5$ and the beams and photocell 17 ensures that a pencil of light made up of any part of the cross section of either beam, irradiates the photocell cathode over substantially the same area, with substantially the same intensity distribution. This ensures that movement of either beam transverse to its direction, occasioned by shaking of the strip 15 in the measuring beam 12 and movement in the comparison beam of a shutter 19 (whose function will be described below), causes no difference in photocell response through an overall shift of the light intensity distribution pattern over the surface of the cathode.

Before reaching lens $L_5$ the comparison beam 13 is varied in width along one dimension of its cross-section by the shutter 19, already referred to, which is spiral in shape and is mounted on the spindle 20 of a high speed meter movement (21) of the moving coil centre zero type. This is supplied by current, in a manner to be explained hereafter, in such a way as to maintain equality between the light flux falling on the photocell from the residual portions of the comparison beam 13 and the measuring beam 12.

Owing to the action of the chopper disc 11 the photocell 17 is alternately illuminated, for equal intervals of time, by light from the residual portions of the comparison and measuring beams. If these are unequal, an alternating voltage will be set up across a load resistor (not shown in Figure 1) placed in the cathode of the cell. The phase of this alternating voltage will differ by 180° according as the light flux in the measuring comparison beam is the greater.

The alternating voltage from the photocell 17 is amplified by an A. C. amplifier 22 of normal design whose output is fed to a phase sensitive rectifier stage 23. The D. C. output is amplified in a D. C. output stage 24 and the amplified output of one sign or the other is fed to the high-speed meter movement 21, which is of the centre zero type. The meter movement 21 thereupon moves the spiral shutter 19 to increase or decrease the cross-section of the comparison beam 13, in the direction which tends to reduce to zero the difference between the light flux carried by the residual portions of the two beams 12 and 13. By making the amplifier of high gain, the beams can be made equal to a very high accuracy, and the angular position of the spiral shutter 19 can be calibrated in terms of strip width. Moreover a continuous width record can be provided by means of a pointer and pen 25 co-operating with a chart recorder 26 in known manner.

The construction of the arrangement just described will now be described with reference to Figure 2 of the drawings. In this particular construction the instrument is designed to measure the width of hot steel strip whose mean width may lie between 4 and 16 inches, the variation on any given width being up to $\pm \frac{1}{8}$ inch. The accuracy of measurement required is $\pm 0.02$ inch, but greater accuracies can be achieved by the instrument described. The strip may normally pass at about 20 ft./second, and may move bodily $\pm \frac{1}{8}$ inch in the direction of its width, and $\pm \frac{1}{8}$ inch at right angles to it.

The instrument is built in two halves, to be located at each side of the strip. The two halves are each built on a heavy base-plate 30, 31 respectively on which all the components are mounted and are covered by steel boxes (not shown) which fit over flanges 32 and 33. The lamp 10 fits into a socket 34. The lenses $L_1$, $L_3$, and slit $S_1$ are contained in a measuring beam collimator housing 35, and the lenses $L_2$, $L_4$, slit $S_2$ and mirror $M_2$ in a comparison beam collimator housing 36. The mirror $M_1$ is mounted on a support 37 which is rigidly connected to the housing 36.

Also on the baseplate 30, but on the side remote as shown in the drawing, is an electric motor 38 driving the chopper disc 39, which projects through a slot 40 cut in the baseplate 30. The chopper disc has six teeth, and rotates at a speed adjustable by a small resistance (not shown) in series with the motor 38, to chop the light beams at a frequency between 200 and 300 cycles per second. The chopper disc may be 7½" in diameter, with teeth cut ½" deep.

The lamp 10 may conveniently be a Pointolite small source lamp, operated by direct current.

On the same side of the plate as the chopper motor 38 is mounted a reference frequency signal generator (represented by the rectangle 41 and shown diagrammatically in Figure 3 to be described hereafter) for supplying electronically an electrical pulse of the same frequency as the chopping of the light beams. This is required by the phase sensitive rectifier stage described above. The image of a small flash lamp bulb filament is formed on a portion of the teeth of the chopper disc 11 lying within the broken lines 41, behind which is placed a photoelectric cell, the output of which is applied to a one-stage valve amplifier. The output of this amplifier is an alternating voltage of the same frequency as the chopping frequency of the light beam, and by moving the position of the image of the bulb filament on the chopper disc the phase of this voltage can be adjusted.

The beams pass from one box to another through the telescopic tubes 42, 43, which permit of the baseplates 30, 31 being spaced apart at a suitable distance to accommodate the strip width chosen.

On the second baseplate 31 the measuring beam is reflected by the prism $P_2$, and the mirror $M_3$ through the lens $L_5$ which also receives the comparison beam. The lens $L_5$ may be a rectangular plastic lens, sufficiently large to admit both beams side by side at maximum width. The comparison beam is controlled by the spiral shutter 19 which consists of a spiral of thin foil mounted on a spider of thin brass flanged for rigidity, and fixed to a bush 44 which fits over the spindle 20 of the meter movement 21.

The photocell 17 is mounted in a shielding box 45 and its output is amplified by the A. C. amplifier 22. The boxes housing the phase sensitive rectifier stage 23 and the D. C. output stage 24, on the reverse side of baseplate 31, are also shown.

The application of this instrument to the measurement of the width of steel strip involves the measuring beam 12 passing through the open air beside each strip edge. There is no necessity for the comparison beam 13 to go outside the instrument. The measuring beam 12 passes through windows 46 of heat resisting glass, over which pass jets of air from jets 47, other jets 48 serving to remove the envelope of heated air around each edge which otherwise gives rise to refraction of the measuring beam.

Details of the electronic circuits are shown in Figure 3 and as these are typical circuits for performing their appropriate function and form no part of the invention per se, it is unnecessary to discuss them in detail. Briefly, valve $V_1$ is a first amplifier stage fed from the load resistor of the photocell 17 and feeding a push-pull amplifying and phase-splitting stage constituted by the two valves $V_2$ and $V_3$. These in turn feed a phase sensitive rectifier stage $V_4$, $V_5$, the suppressor grids of which are fed with reference frequency signals from the generator comprising valve $V_8$. This latter valve is fed from the output of a photocell 49 which receive light interrupted by the chopper disc 11 in the manner previously described. Valves $V_6$, $V_7$ constitute the D. C. output stage, their anodes being brought to opposite ends of the coil 50 of the meter movement 21, the centre of the coil 50 going to H. T. positive. As already explained when an alternating voltage of the chopping frequency is produced the rectifier stage raises the D. C. voltage on the grid of one of the valves $V_6$, $V_7$ and lowers it on the other thus producing an unbalance in the anode currents passing through the coil 50 which is thus deflected one way or the other.

Although the jets 47 and 48 (Figure 2) may in most circumstances prevent dimming of the windows 46, in some cases dimming may occur resulting in a permanent and spurious unbalance in the beams giving rise to an error in width reading whilst dimming obtains.

The second arrangement to be described employs a modified optical system for use where dimming may occur and which is designed to avoid or reduce the effect thereof.

Figure 4:
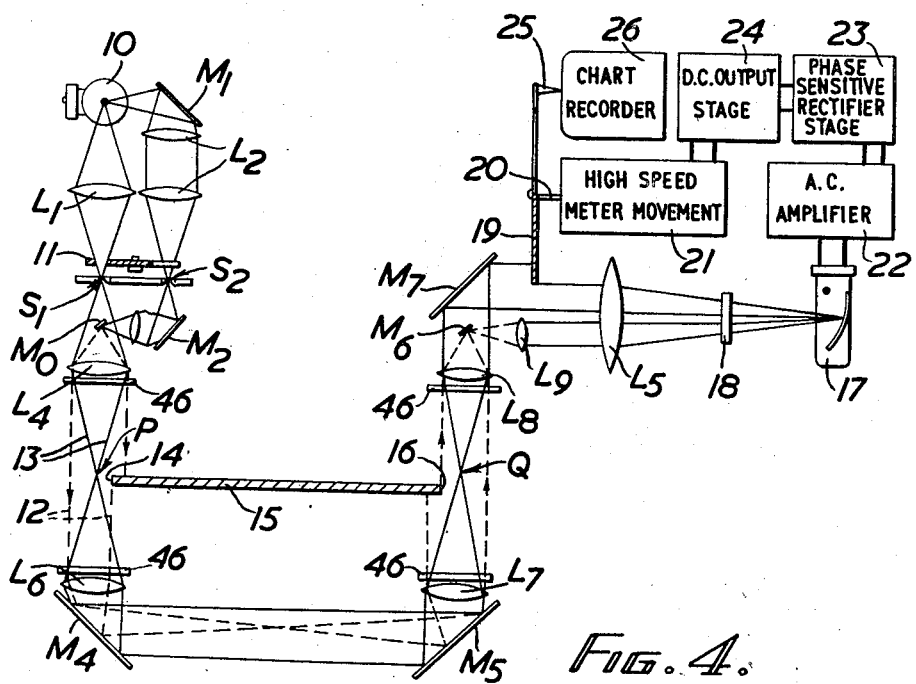
Figure 4 is a schematic diagram of the second arrangement.

The electronic circuits employed and the general arrangement of the apparatus are similar to the first arrangement so that the second arrangement will only be described with reference to the schematic diagram of Figure 4 in which similar parts to those in Figure 1 are similarly referenced.

The optical system is modified so that the measuring and comparison beams 12 and 13 are transmitted through the same external windows, and substantially the same areas of these, so that any general dimming of these glasses which reduces the transmission, though not being so serious as to render the instrument inoperable, will tend to balance out in the two beams and reduce or eliminate any accompanying error.

As before, the images of the lamp filament are thrown on slits $S_1$, $S_2$ by lenses $L_1$ and $L_2$. In this case however the light passing through $S_1$ forms the comparison beam 13 and that passing through $S_2$ the measuring beam 12. The lens $L_4$ is placed at twice its focal length from $S_1$, so that an image of $S_1$ is formed at an equal distance on the other side of lens $L_4$. This focus P is placed in the approximate plane of the strip 15, and slightly outside the limit of movement thereof. It is termed P in Figure 4.

Considering the beam from $S_2$ this is reflected by a right angled mirror $M_2$ and passes through a lens $L_3$, which forms an image of slit $S_2$ on a small mirror $M_0$, surface coated. Mirror $M_0$ is fixed on a narrow mount spanning the beam which is passing between slit $S_1$ and lens $L_4$, so that it will not affect the linearity of beam illumination against width required by the principle of the instrument and the obstruction formed will not affect the action of the comparison beam. Mirror $M_0$ being placed in the focal plane of lens $L_4$ the light brought to focus at it will be made parallel by lens $L_4$ and form the measuring beam 12 as before, one side being cut off by the first edge 14 of the strip 15.

After passing by the strip edge 14, both beams 12 and 13 are received by a lens $L_6$, and pass out below the second strip edge from a similar lens $L_7$ after being turned through two right angles by mirrors $M_4$ and $M_5$. These two lenses $L_6$ and $L_7$ are of equal focal length and are placed a distance apart equal to twice their focal length. Because of this, parallel light entering them emerges parallel, having been brought to a focus by the first in the focal plane of the second. Also, light brought to a focus at a distance in front of lens $L_6$ equal to the focal length will be brought to a focus again an equal distance from the lens $L_7$. Lens $L_6$ is placed at a distance equal to its focal length from the point P where the comparison beam 13 is focussed. Accordingly, the comparison beam 13 passes through $L_6$ and $L_7$ and is brought to a second focus at Q, in a corresponding position close to the second strip edge 16. The measuring beam 12 enters $L_6$ parallel, and so emerges from $L_7$ parallel, having also been given the lateral inversion necessary which was supplied by the arrangement of prisms in the instrument previously described. After Q the two beams enter lens $L_3$, which brings the measuring beam 12 to a focus at the small mirror $M_6$ where it is reflected through a right angle on to the lens $L_9$ which makes it parallel once more. The comparison beam 13 is also turned through a right angle by the mirror $M_7$ and is made parallel by lens $L_8$. Both beams 12 and 13 are so collimated and made parallel to each other and enter lens $L_5$ to be focussed on the photocell 17, the system after this point being exactly the same as with the instrument previously described.

This system requires that the optical length of path between points P and Q should be constant. The adaptability of the system to a variety of strip widths, which in the first instrument described is obtained by altering the separation of the baseplates, is secured by extending mirrors $M_4$ and $M_5$ and mounting them permanently a fixed distance apart. Lenses $L_6$ and $L_7$ are mounted in a fixed position relative to the remainder of the optical system exclusive of mirrors $M_4$, $M_5$. It will be seen that by this arrangement the separation of the two chassis can be varied as in the other instrument to cover a desired variety of strip widths. The mirrors $M_4$ and $M_5$ must be mounted on a sub-assembly on which both boxes slide in such a way that the axes of the beam systems passing by the edges P and Q are symmetrically disposed with respect to mirrors $M_4$ and $M_5$.

Although it is possible to locate the chopper disc elsewhere in the optical system than near the source, there are distinct advantages in doing so. Thus any stray light of steady intensity which enters the optical paths after the chopper disc has no effect on measurements as it does not cause variations in photocell output. If the chopper disc is located later in the system stray light, which may be radiation from the hot strip, is modulated by the disc and therefore causes variations in the photocell output. It is also possible to have a simpler optical system and the beams can be kept fairly narrow at the chopping position thus giving a sharp rectangular waveform.

We claim:

1. Apparatus for measuring continuously the distance between two opposite edges of an opaque moving strip of substantial width comprising a source of light, light projection means positioned on one side of the plane of said strip for forming light from said source into a parallel-sided beam of light having a width less than the distance between said edges and for projecting said beam through the plane of said strip at a position overlapping a first one of said edges, so that one marginal portion only of said beam is intercepted by said strip, optical reflecting means positioned on the opposite side of the plane of said strip to said light projection means for receiving the part of said beam which passes said first edge and for directing it through the plane of said strip at a position overlapping the second of said edges, with that margin of the beam which passed immediately adjacent said first edge located outside of said second edge, so that another and different marginal portion of the beam is intercepted by said strip, and a photoelectric light flux measuring device disposed on the same side of the plane of said strip as said light projection means and positioned to receive the residual beam passing said second edge.

2. Apparatus for measuring continuously the distance between two opposite edges of an opaque moving strip of substantial width comprising a source of light, light projection means positioned on one side of the plane of said strip for forming light from said source into a parallel-sided beam of light having a width less than the distance between said edges and for projecting said beam through the plane of said strip at a position overlapping a first one of said edges, so that a marginal portion at one side of said beam is intercepted by said strip, optical reflecting means positioned on the opposite side of the plane of said strip from said light projection means for receiving the part of said beam which passes said first edge and for directing it through the plane of said strip at a position overlapping the second of said edges, with that margin of the beam which passed immediately adjacent said first edge located outside of said second edge, so that another and different marginal portion at the opposite side of the beam is intercepted by said strip, and a light flux measuring device positioned to receive the residual beam passing said second edge.

CHARLES BURNS.
SAMUEL S. CARLISLE.

References Cited in the file of this patent

UNITED STATES PATENTS

| Number | Name | Date |
| --- | --- | --- |
| 1,919,182 | Fitzgerald | July 18, 1933 |
| 2,113,899 | Oram | Apr. 12, 1938 |
| 2,237,811 | Cockrell | Apr. 8, 1941 |
| 2,372,162 | Ryan | Mar. 20, 1945 |
| 2,474,906 | Meloon | July 5, 1949 |
| 2,548,755 | Vossberg et al. | Apr. 10, 1951 |

FOREIGN PATENTS

| Number | Country | Date |
| --- | --- | --- |
| 601,843 | Germany | Aug. 25, 1934 |